United States Patent
Park

(10) Patent No.: US 8,789,414 B2
(45) Date of Patent: Jul. 29, 2014

(54) LEVEL SENSING APPARATUS

(75) Inventor: Young-Un Park, Seongnam-si (KR)

(73) Assignee: Chemtronics Co., Ltd., Chungcheongnam-do (KR)

( * ) Notice: Subject to any disclaimer, the term of this patent is extended or adjusted under 35 U.S.C. 154(b) by 213 days.

(21) Appl. No.: 12/996,075

(22) PCT Filed: May 28, 2009

(86) PCT No.: PCT/KR2009/002831
§ 371 (c)(1),
(2), (4) Date: Jan. 7, 2011

(87) PCT Pub. No.: WO2009/148233
PCT Pub. Date: Dec. 10, 2009

(65) Prior Publication Data
US 2011/0259098 A1 Oct. 27, 2011

(30) Foreign Application Priority Data
Jun. 3, 2008 (KR) .......... 10-2008-0052150

(51) Int. Cl.
*G01F 23/24* (2006.01)
(52) U.S. Cl.
USPC .......... 73/304 C; 73/290 R; 73/304 R; 73/149
(58) Field of Classification Search
USPC .................... 73/304 C, 290 R, 149
See application file for complete search history.

(56) References Cited

U.S. PATENT DOCUMENTS

| | | | | |
|---|---|---|---|---|
| 4,003,259 A * | 1/1977 | Hope | ......................... | 73/304 C |
| 4,064,753 A * | 12/1977 | Sun et al. | ................... | 73/304 C |
| 4,166,388 A * | 9/1979 | Sun et al. | ................... | 73/304 R |
| 4,749,988 A * | 6/1988 | Berman et al. | ............... | 340/618 |
| 5,043,707 A * | 8/1991 | Heinze | ......................... | 340/618 |
| 5,121,631 A * | 6/1992 | Koon | ......................... | 73/290 R |
| 5,315,872 A * | 5/1994 | Moser | ......................... | 73/304 C |
| 5,465,619 A * | 11/1995 | Sotack et al. | ............... | 73/304 C |
| 6,073,488 A * | 6/2000 | Byatt et al. | .................. | 73/304 C |
| 6,490,920 B1 * | 12/2002 | Netzer | ......................... | 73/304 C |
| 7,064,560 B2 * | 6/2006 | Yamamoto et al. | ........... | 324/663 |

(Continued)

FOREIGN PATENT DOCUMENTS

| | | |
|---|---|---|
| JP | 2007-298361 A | 11/2007 |
| JP | 2007-298362 A | 11/2007 |
| KR | 2001-0051373 A | 6/2001 |

OTHER PUBLICATIONS

English Translation of JP 2007-298361, Nov. 15, 2007.*

*Primary Examiner* — Hezron E Williams
*Assistant Examiner* — Alexander Mercado
(74) *Attorney, Agent, or Firm* — Birch, Stewart, Kolasch & Birch, LLP

(57) ABSTRACT

There is provided a level sensing apparatus detecting the level of a detected material, the apparatus including: a circuit board; a first electrode and a second electrode having different dimensions, which are formed on one surface and the other surface of the circuit board; a first dielectric layer and a second dielectric layer having different thicknesses, which are formed on the first electrode and the second electrode; and a judgment unit electrically connected with the first electrode and the second electrode through the circuit board to judge the level of the detected material by using capacitances detected from the first electrode and the second electrode. According to the present invention, it is possible to accurately sense a level without being influenced by surrounding circumstances such as temperature, and the like.

4 Claims, 5 Drawing Sheets

(56) References Cited

U.S. PATENT DOCUMENTS

| | | | |
|---|---|---|---|
| 7,509,856 B1 * | 3/2009 | Winkens et al. | 73/304 C |
| 7,600,424 B2 * | 10/2009 | Sasaki et al. | 73/304 C |
| 7,798,586 B2 * | 9/2010 | Watanabe | 347/7 |
| 8,474,315 B2 * | 7/2013 | Ohshima et al. | 73/304 C |
| 2003/0000303 A1 * | 1/2003 | Livingston et al. | 73/304 C |
| 2011/0120219 A1 * | 5/2011 | Barlesi et al. | 73/304 C |

* cited by examiner

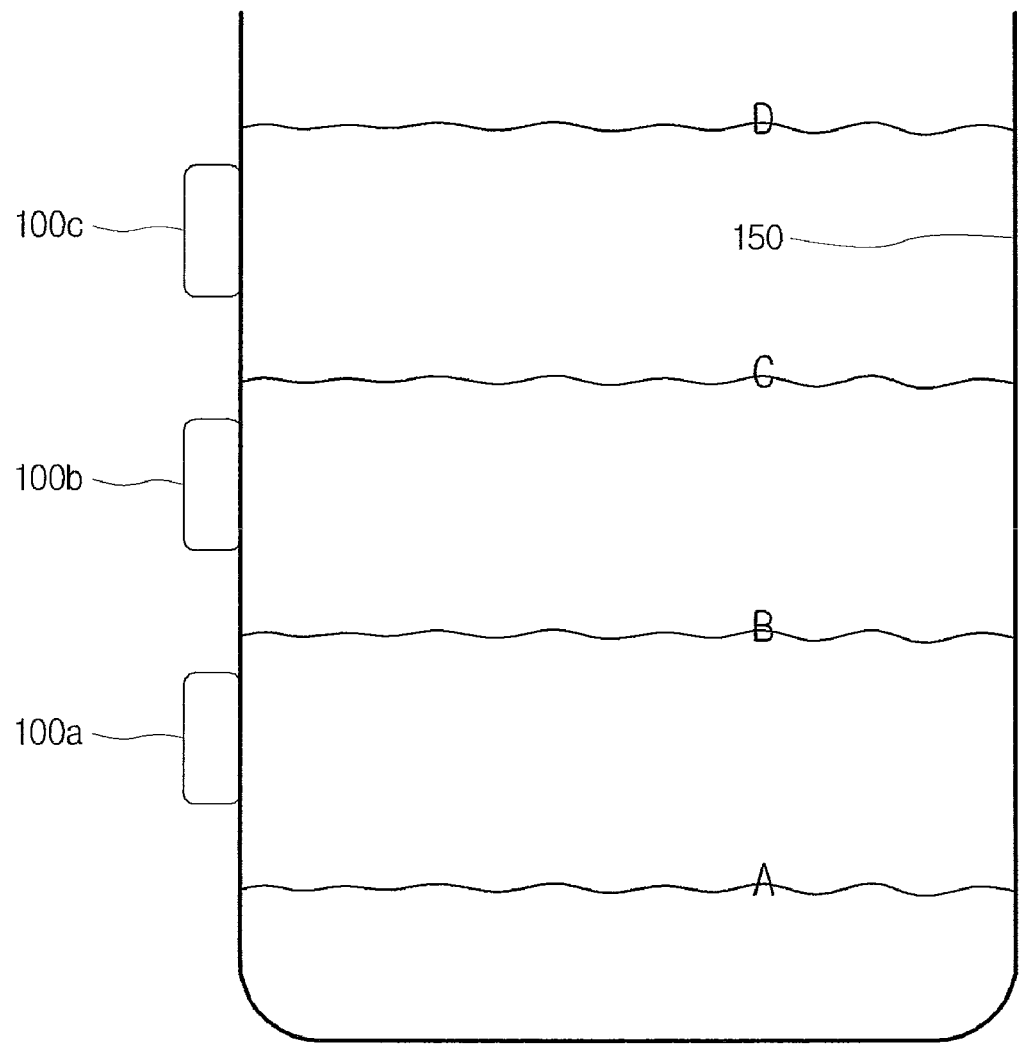

LEVEL SENSING APPARATUS

TECHNICAL FIELD

The present invention relates to a level sensing apparatus, and more particularly, to a level sensing apparatus sensing a displacement level of a detected material by using a capacitance detected from two electrodes.

BACKGROUND ART

A level sensing apparatus is used to detect the level of liquid, liquid particles, or powdery particles in an industrial automatic system or a personal system. The level detected by the level sensing apparatus means the position or height of a charging surface (or filling surface) of a detected material and the level sensing apparatus is used to sense the height of the detected material charged (or filled) in a charging tank (or a filling tank). That is, the level sensing apparatus is applied to an oil tank of a vehicle to be used to detect a charging amount (or a filling amount) of oil and also used to detect the amount of an injected material charged in the charging tank and injected into a product in an automation factory.

The level sensing apparatus is classified into a float level sensing apparatus, an electronic level sensing apparatus, a wave level sensing apparatus, or a capacitance level sensing apparatus according to a driving method.

Among them, the capacitance level sensing apparatus senses the level of the detected material by using a capacitance increased as liquid, powdery particles, and the like having a dielectric constant larger than air ascend to be close to an electrode included in the level sensing apparatus.

Since the capacitance level sensing apparatus among them uses the dielectric constant of a charged material unlike the float level sensing apparatus, the electronic level sensing apparatus, the wave level sensing apparatus, and the like, the dielectric constant of the charged material serves as a primary factor in sensing.

However, in this case, the dielectric constant of the charged material may rapidly vary depending on temperature, which causes the level sensing apparatus to malfunction. For example, in the case of a level sensing apparatus that detects the height of water injected into a container, the dielectric constant of water significantly varies depending on temperature, as a result, a reference for compensating the varied dielectric constant is required.

Referring to FIG. 1 illustrating characteristics of water, the dielectric constant of water is maintained in the range of 75 to 80 at room temperature, but as temperature increases, the dielectric constant varies to approximately 50. Therefore, the difference between the dielectric constants of water which is the detected material is twice the maximum. In this case, even though water is charged up to the corresponding height, the dielectric constant of water decreases to one half, as a result, the level sensing apparatus cannot sense the height.

For this reason, in order to solve the problem, in the related art, a level sensing apparatus was used, which has a structure in which another level sensing apparatus for the reference is installed on the bottom of the container to acquire variation in the dielectric constant of water depending on variation of temperature on the basis of a capacitance detected from the reference and reflect the acquired variation in the dielectric constant when water starts to be charged from the bottom.

DISCLOSURE

Technical Problem

Accordingly, in order to solve the above-mentioned problems, it is an object of the present invention to provide a level sensing apparatus and a level sensing method that sense a level by using a reference electrode and a level sensing electrode and different detection values detected from both electrodes.

Other objects of the present invention will be more apparent through exemplary embodiments to be described below.

Technical Solution

In order to achieve the above-mentioned object, according to an exemplary embodiment of the present invention, there is provided a level sensing apparatus.

The level sensing apparatus detecting the level of a detected material according to the exemplary embodiment of the present invention includes: a circuit board; a first electrode and a second electrode having different dimensions, which are formed on one surface and the other surface of the circuit board; a first dielectric layer and a second dielectric layer having different thicknesses, which are formed on the first electrode and the second electrode; and a judgment unit electrically connected with the first electrode and the second electrode through the circuit board to judge the level of the detected material by using capacitances detected from the first electrode and the second electrode.

The dimensions of the first electrode and the second electrode and the thicknesses of the first dielectric layer and the second dielectric layer may be formed so that the capacitance formed in the first electrode is larger than the capacitance formed in the second electrode when the level sensing apparatus is exposed to air.

The dimensions of the first electrode and the second electrode and the thicknesses of the first dielectric layer and the second dielectric layer may be formed so that the capacitance formed in the second electrode is larger than the capacitance formed in the first electrode.

The level sensing apparatus may further include an internal oscillating circuit connected with at least one of the first electrode and the second electrode, wherein a frequency of an oscillation signal generated from the internal oscillating circuit is varied by each capacitance formed in the first electrode or the second electrode.

The level sensing apparatus may be attached onto the inner surface of a charging container charged with the detected material vertically to the inner surface or attached on the outer surface of the charging container in parallel to the outer surface.

According to another exemplary embodiment of the present invention, there is provided a level sensing system.

The level sensing system detecting the level of a detected material according to the exemplary embodiment of the present invention includes: one or more level sensing apparatus on the inner surface or the outer surface of a charging container charged with the detected material in multi-stages, wherein the one or more level sensing apparatus includes a circuit board; a first electrode and a second electrode having different dimensions, which are formed on one surface and the other surface of the circuit board; a first dielectric layer and a second dielectric layer having different thicknesses, which are formed on the first electrode and the second electrode; and a judgment unit electrically connected with the first electrode and the second electrode through the circuit board to judge the level of the detected material by using capacitances detected from the first electrode and the second electrode.

Advantageous Effects

As described above, according to an exemplary embodiment of the present invention, a reference electrode and a level sensing electrode can be included in one level sensing apparatus to simplify the configuration of the level sensing apparatus.

Further, according to the exemplary embodiment of the present invention, it is possible to accurately sense a level without being influenced by surrounding circumstances such as temperature, and the like.

DESCRIPTION OF DRAWINGS

FIG. 5 is a diagram illustrating a configuration of a level sensing system using the level sensing apparatus according to the exemplary embodiment of the present invention.

MODE FOR INVENTION

Figure 1:
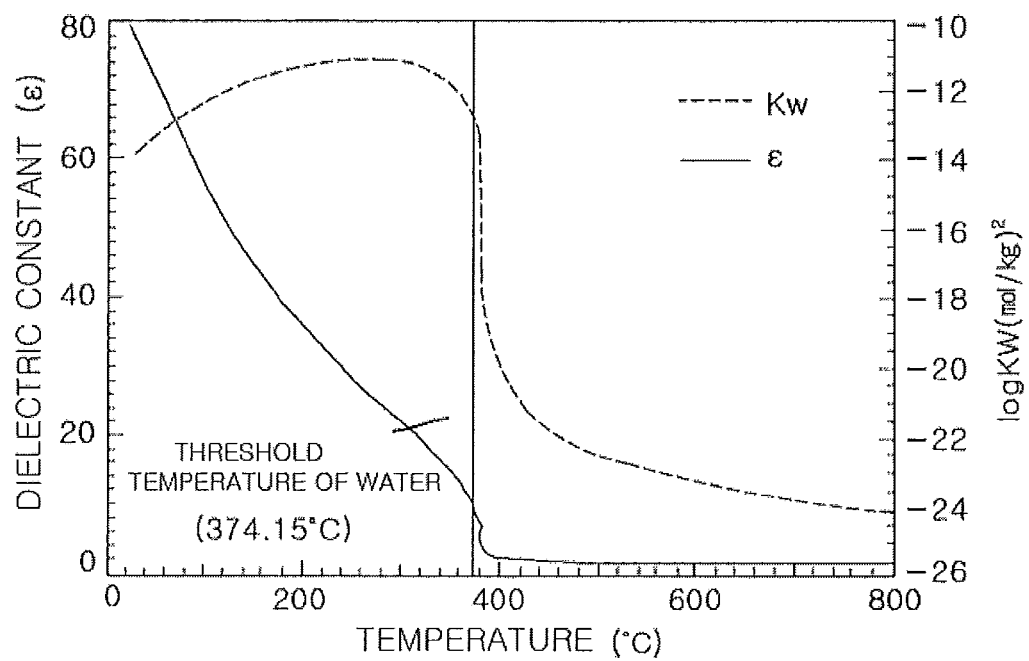
FIG. 1 is a diagram illustrating a characteristic of water.

Although the present invention can be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

Terms including ordinal numbers such as 'first', 'second', etc. can be used to describe various components, but the components are not limited to the terms. Terms described in the specification is used to discriminate one component from other components. For example, the first component may be called the second component without departing from the scope of the present invention. Likewise, the second component may be called the first component. The term 'and/or' includes a combination of a plurality of items or any one of a plurality of terms.

Stated that any components are "connected" or "coupled" to other components, it is to be understood that the components may be directly connected or coupled to other components, but another component may intervene therebetween. On the other hand, stated that any components are "directly connected" or "directly coupled" to other components, it is to be understood that there is no another component therebetween.

The terms used in the specification is used to describe only specific embodiments and is not intended to limit the present invention. The singular forms are intended to include the plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meaning of the context of the related art, and they should not be ideally or excessively formally defined unless the context clearly dictate otherwise.

Hereinafter, exemplary embodiments of the present invention will be described in detail with reference to the accompanying drawings and like reference numerals refer to like elements regardless of the reference numerals in describing the exemplary embodiments with reference to the accompanying drawings and a duplicated description thereof will be omitted.

Hereinafter, a level sensing apparatus means a capacitance type level sensing apparatus.

Figure 2:
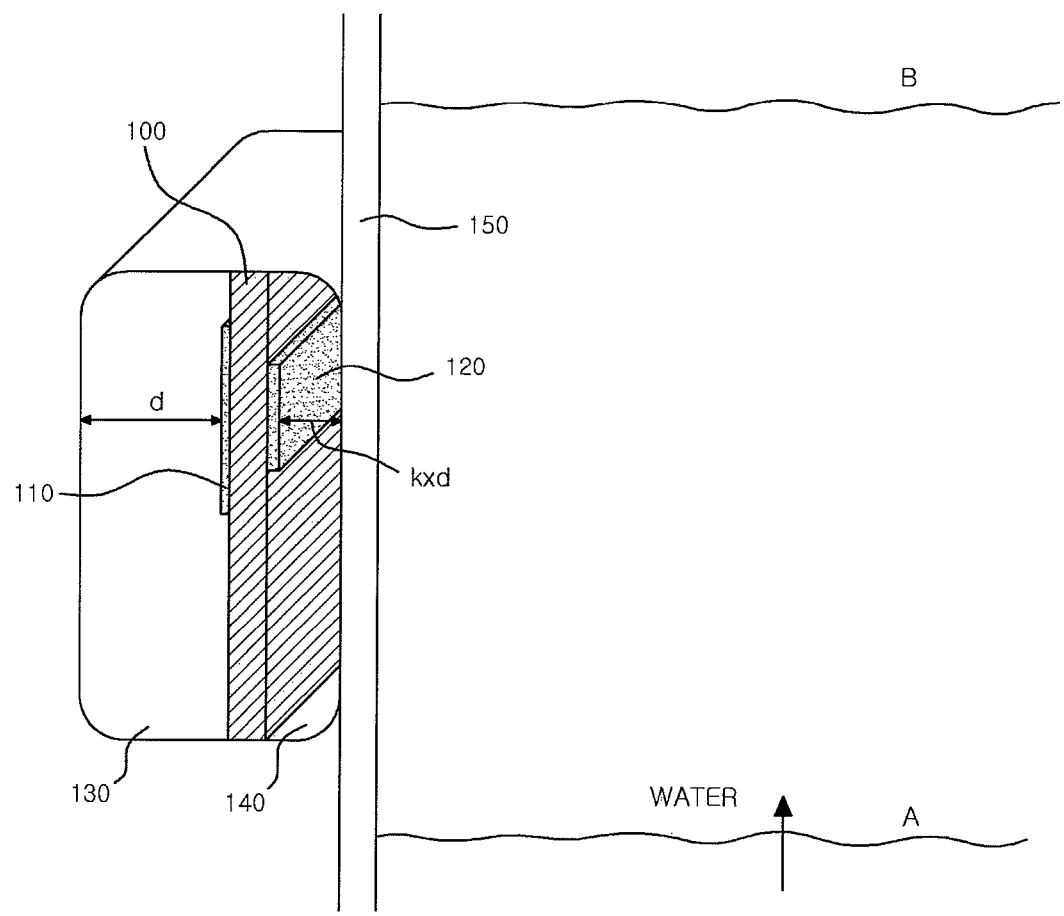
FIG. 2 is a side view of a level sensing apparatus according to an exemplary embodiment of the present invention.

FIG. 2 is a side view of a level sensing apparatus according to an exemplary embodiment of the present invention.

Referring to FIG. 2, a touch sensing apparatus according to the exemplary embodiment of the present invention includes a circuit board 100, a first electrode 110, a first dielectric layer 130, a second electrode 120, and a second dielectric layer 140.

Examples of the circuit board 100 may include a printed circuit board (PCB), a flexible printed circuit board (FPCB), and the like.

The first electrode 110 and the second electrode 120 are electrodes that are made of other metallic conductive materials and have a plate-like, linear, or point-like surface. However, the first electrode 110 and the second electrode 120 included in the exemplary embodiment of the present invention may have different dimensions. In this case, the dimension influences a capacitance and it will be described below.

The first electrode 110 and the second electrode 120 are formed on one surface and the other surface of the circuit board 100, respectively and electrically connected with the circuit board 100. Therefore, an electrical influence from the outside of the level sensing apparatus through the first electrode 110 and the second electrode 120 may be transferred to a level sensing circuit (not shown) connected to the circuit board 100 through the circuit board 100.

The level sensing circuit includes an internal oscillating unit (not shown) and an IC circuit (not shown). The internal oscillating unit is connected with the first electrode 110 and the second electrode 120 through a circuit pattern formed on the circuit board 100. A capacitance formed in each of the first electrode 110 and the second electrode 120 may be detected by an oscillation signal generated by the internal oscillating unit. That is, since the first electrode 110 and the second electrode 120 form capacitances with a ground through the first dielectric layer 130 or the second dielectric layer 140 formed on the outer surface of each electrode and air, the frequency of the oscillation signal varies. The varied frequency may be detected by diversified methods and it will be described below.

Between the first electrode 110 and the second electrode 120, the first electrode 110 corresponds to a reference electrode and the second electrode 120 corresponds to a level sensing electrode. That is, the capacitance formed by the first electrode 110 is used to acquire a reference value and the capacitance of the second electrode 120 is used to acquire a detection value for level sensing.

A capacitance formed in the reference electrode 110 before a detected material (i.e., water) is close to or contacts the level sensing apparatus of the exemplary embodiment of the present invention should be larger than that formed in the level sensing electrode at all times.

However, when liquid particles of water having a large dielectric constant (assumed that the dielectric constant is 80) are close to or contact the level sensing apparatus, the capacitance formed in the level sensing electrode is larger than that of the reference electrode. Therefore, the level sensing apparatus according to the exemplary embodiment of the present invention may sense that the liquid particles which are the detected material are close to the level sensing apparatus.

For this, the level sensing apparatus according to the exemplary embodiment of the present invention should adjust the dimensions of the first electrode 110 and the second electrode 120 and the thicknesses of the first dielectric layer 130 and the second dielectric layer 140 formed thereon. Hereinafter, first, a case in which the detected material is not close to the level sensing apparatus according to the exemplary embodiment of the present invention will be primarily described.

First, the capacitance which the first electrode 110 forms with the ground (not shown) is the capacitance when the first electrode 110 and the ground are used as both electrodes and the dielectric layer 130 and air are included between both electrodes. That is, as shown in FIG. 2, the first dielectric layer 130 having a thickness d is formed on the first electrode 110. The dielectric layer may be substituted with a different term such as an overlay.

The dielectric layer may be a polymer, a rubber, and the like having a dielectric constant in the range of 2 to 10 and hereinafter, a case in which the dielectric layer is made of an acrylic resin will be primarily described. It is assumed that the dielectric constant of the acrylic resin is 2.

Therefore, a capacitance configured by the first electrode 110, an acryl 130, air, and a ground electrode is formed and in this case, the capacitance is influenced by the dimension of the first electrode 110 and the thickness of the acryl 130 which is the dielectric layer. That is, as the dimension of the first electrode 110 is larger and the acryl 130 is thinner, the capacitance becomes larger.

As described above, since the first electrode 110 included in the exemplary embodiment of the present invention as the reference electrode should be larger than the capacitance of the second electrode 120, the first electrode 110 and the second electrode 120 are different from each other in their dimensions. For example, the dimension (2×S) of the first electrode 110 may be twice larger than the dimension (S) of the second electrode 120.

Since the thickness of the acrylic layer corresponds to a factor for adjusting the capacitance in addition to the dimensions of the electrodes, the thickness of the acrylic layer 130 formed on the first electrode 110 may be adjusted to d and the thickness of the acrylic layer (second dielectric layer) 140 formed on the second electrode 120 may be adjusted to 0.7×d (that is, k=0.7). Therefore, the capacitance C1 formed in the first electrode is larger than the capacitance C2 formed in the second electrode.

However, it is merely an example for describing the exemplary embodiment of the present invention and the thicknesses and dimensions may be experimentally adjusted. Therefore, K shown in the figure is not limited to 0.7. However, the thickness of the acrylic layer 130 formed on the second electrode 120 may be manufactured to be smaller than that of the acrylic layer 110 formed on the first electrode 110 (that is, K<1). Its purpose is that the second electrode 120 is more largely influenced by the liquid particles of water charged in a container. It will be described in detail with reference to FIG. 3.

In this case, when an internal oscillating circuit connected to the first electrode 110 and the second electrode 120 applies an oscillation signal, an oscillation frequency is influenced by the capacitance formed in each electrode.

In detail, a resistor-capacitor (RC) oscillating circuit may be used as the internal oscillating circuit and the RC oscillating circuit is connected with the first electrode 110 or the second electrode 120 to influence the oscillation signal generated by the internal oscillating circuit. The RC oscillating circuit may be configured so that the frequency is in proportion or inverse proportion to the capacitance depending on a connection state of the electrode.

The number of the internal oscillating circuits may be two according to the number of the electrodes and it is apparent that one internal oscillating unit may be configured to be time-divisionally connected to the first electrode 110 and the second electrode 120 with repetition to acquire each detection value. The detection value may be a value acquired by detecting various electrical characteristics such as a frequency, a voltage, a current, and the like depending on the configuration of the circuit, but hereinafter, a count value acquired by counting a clock signal in a counter mode is assumed and described as the detection value.

The oscillation signal influenced by the first electrode 110 or the second electrode 120 is transferred to a clock signal generating unit to be converted into the clock signal. A Schmitt trigger circuit may be used as the clock signal generating unit.

The clock signal converted by the clock signal generating unit is inputted into a counter and the counter counts the clock signal during a predetermined time cycle. Therefore, a value counted by the counter reflects the capacitance formed in the first electrode 110 or the capacitance formed in the second electrode 120.

Figure 3:
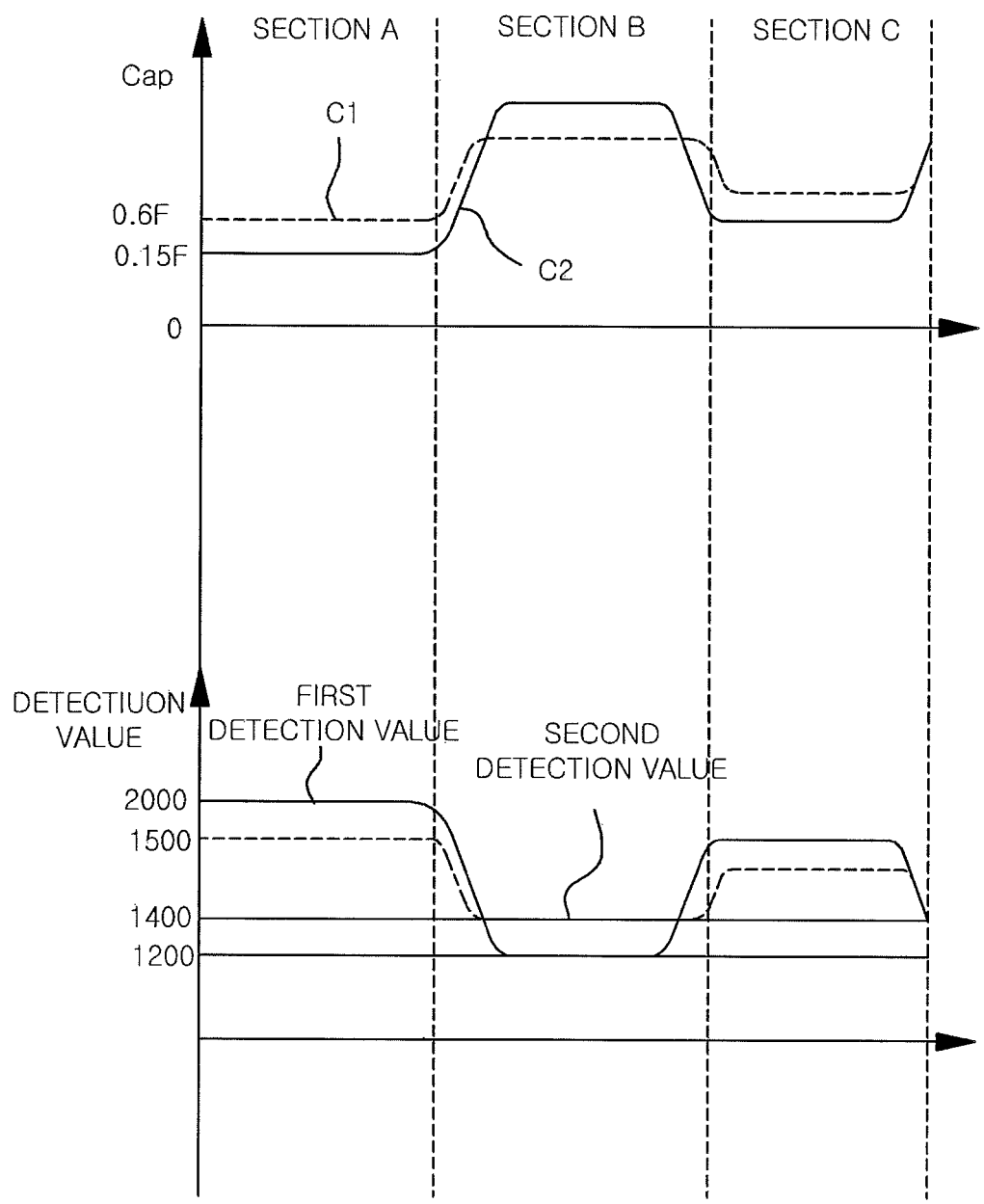
FIG. 3 is a diagram illustrating variations in capacitances and count values detected by the level sensing apparatus according to the exemplary embodiment of the present invention.

When it is described in more detail with reference to FIG. 3, FIG. 3 is a diagram illustrating variation in the capacitance and the count value when the surface of the water is close to the height H and thereafter, goes down to the bottom of the container again while water which is the detected material is charged in the case where the level sensing apparatus according to the exemplary embodiment of the present invention is installed at the height H of a detection container.

In section A, water is not charged (or not filled) in a charging container (or a filling container) 150, such that the level sensing apparatus according to the exemplary embodiment of the present invention is exposed to air, in section B, water is charged (or filled) in the charging container 150, such that the surface of the water reaches H, and in section C, the water surface descends to the bottom of the charging container 150 while water is again drained from the charging container 150.

First, in the case of section A, i.e., the case where the level sensing apparatus according to the exemplary embodiment of the present invention is exposed to air, the capacitance C1 of the first electrode 110 is 0.6 F, and the count value (first detection value) may be 1500 by being influenced by the capacitance. The capacitance C2 of the second electrode is 0.15 F, approximately four times smaller than the capacitance C1 of the first electrode 110 and the counter value (second detection value) influenced by the capacitance may be 2000. However, it is merely an example and it is apparent that the capacitance and the count value may depend on the configurations of the dimensions of the first electrode 110 and the second electrode 120 and the thicknesses of the dielectric layers formed on the electrodes. For example, when the dimension of the first electrode 110 is eight times larger than that of the second electrode and the thickness of the dielectric layer on the first electrode is twice larger than that of the dielectric layer on the second electrode, C is four times larger than C2 (that is, K=0.5 in FIG. 2).

However, the count value may be in proportion to the frequency of the oscillating circuit depending on the configuration of the circuit and the frequency of the oscillating circuit may be in inverse proportion to the capacitance depending on the configuration of the circuit. As shown in FIG. 3, the circuit is configured so that the frequency of the internal oscillating circuit of the level sensing apparatus according to the exemplary embodiment of the present invention is in inverse proportion to the capacitance.

However, in the case where the water surface reaches the height H while the water which is the detected material is charged in the detection container, that is, in section B, the capacitances C1 and C2 formed in the first electrode 110 and the second electrode 120 are exchanged into each other. Since the dielectric constant of the water is 80, the capacitance C2 of the second electrode 120 installed adjacent to the water is influenced by the dielectric constant of the water to be significantly larger than the capacitance C1 of the first electrode 110. Further, the second electrode 120 is close to the water and the acrylic layer is manufactured to be thinner at a portion thereof, which is formed on the second electrode 120 so as to be significantly influenced by the water. As a result, C2 becomes significantly larger than C1.

In this case, as described above, even though temperature increases to 100° C. or higher and the dielectric constant thus decreases to 50, the capacitance of the second electrode 120 is, as ever, larger than that of the first electrode 110. Therefore, an additional temperature compensation operation may be omitted.

When the capacitance C2 of the second electrode 120 is larger than the capacitance C1 of the first electrode 110, the count value counted by the counter is also varied. The capacitance C1 of the first electrode 110 is varied to 1 F, and the count value (first detection value) influenced by the capacitance C1 decreases from 1500 to 1400, that is, by 100. However, in contrast, the capacitance of the second electrode is varied to 4 F and the detected count value (second detection value) significantly decreases to 1200, that is, by 800.

Therefore, when the count value (first detection value) detected from the first electrode 110 and the count value (second detection value) detected from the second electrode 120 are used as two inputs in a comparator circuit (not shown) included in the level sensing apparatus according to the exemplary embodiment of the present invention, the directions of output signals are opposite to each other. That is, the comparator circuit serves as a judgment unit that senses the level in the level sensing apparatus according to the exemplary embodiment of the present invention.

Connecting the output of the judgment unit to a display device such as an LED allows a use to recognize that the detected material reaches the height H.

However, in section C, that is, when the water descends and the level sensing apparatus according to the exemplary embodiment of the present invention is exposed to air again, the capacitance C1 of the first electrode 110 becomes larger than the capacitance C2 of the second electrode 120 again and the count value (first detection value) detected from the first electrode becomes smaller than the count value (second detection value) detected from the second electrode again.

However, when the water descends, H20 particles in air increase (humidity is high) or beads of water are formed on the wall surface of the container, as a result, the capacitance C1 of the first electrode 110 may not be accurately restored to 0.6 F. However, it may be resolved by experimentally adjusting the dimensions of the first electrode 110 and the second electrode 120 and the thicknesses of the acrylic layers.

Since the capacitance C1 of the first electrode 110 becomes larger than the capacitance C2 of the second electrode 120 again, the count value (first detection value) detected from the first electrode 110 also becomes smaller than the count value (second detection value) detected from the second electrode 120 again.

Therefore, an output signal of a comparator connected with the counter is the same as the output signal outputted in section A, such that the user can recognize that the water which is the detected material descends to the height H.

As described above, the level sensing apparatus according to the exemplary embodiment of the present invention may easily detect the level of the detected material by mounting the reference electrode and the level sensing electrode having different dimensions and thicknesses of the dielectric layers on both surfaces of one circuit board.

Further, the count value which is varied depending on the variation of the temperature needs not to be compensated by previously sensing or counting the temperature of the water by installing an additional reference electrode on the bottom of the charging container 150.

Figure 4:
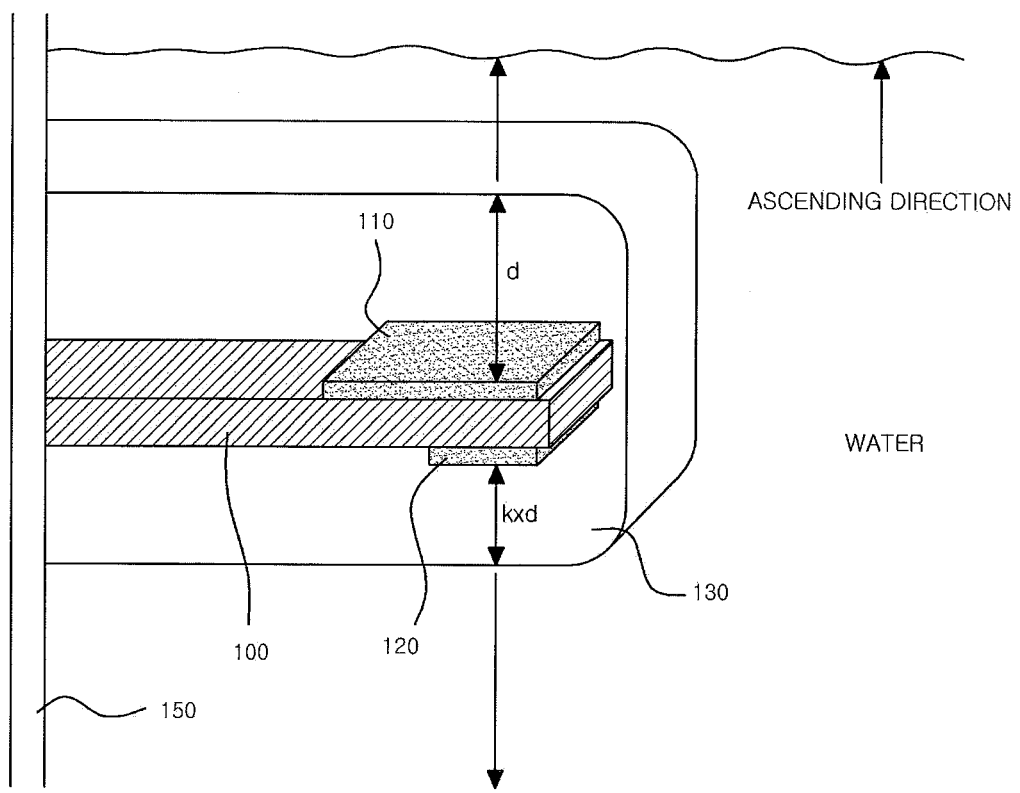
FIG. 4 is a diagram illustrating some of components of a level sensing apparatus according to another exemplary embodiment of the present invention.

FIG. 4 is a diagram illustrating some of components of a level sensing apparatus according to another exemplary embodiment of the present invention.

Referring to FIG. 4, in the level sensing apparatus according to another exemplary embodiment of the present invention, a first electrode 110 and a second electrode 120 are vertically installed on the inner surface of a charging container to be disposed in upward and downward directions of the charging container 150, respectively. It is assumed that the dimensions of the first electrode 110 and the second electrode 120 and the thicknesses of the acrylic layers are the same as those described in FIG. 2. However, the acrylic layers are integrally configured in FIG. 4, but the thicknesses of the acrylic layers formed on the first electrode 110 and the second electrode 120 are different from each other.

In this case, when the water is charged, the surface of the water ascends to reach the level sensing apparatus and the water first contacts the acrylic layer of the second electrode 120.

Even in this case, the variations of the capacitance and the count value described in FIG. 3 are applied as they are. That is, when the water surface is positioned on the bottom of the charging container, the level sensing apparatus is exposed to air, as a result, the capacitance of the first electrode 110 is larger than that of the second electrode 120.

However, since the capacitance of the second electrode 120 rapidly increases at the time when the water surface ascends to contact the dielectric layer of the second electrode 120, the capacitance of the second electrode 120 becomes larger than that of the first electrode 110. As a result, the count value detected from the second electrode 120 also becomes smaller than the count value detected form the first electrode 110.

Therefore, in this case, it can be recognized that the water surface reaches the level sensing apparatus according to the exemplary embodiment of the present invention.

FIG. 5 is a diagram illustrating a configuration of a level sensing system using the level sensing apparatus according to the exemplary embodiment of the present invention.

Referring to FIG. 5, three level sensing apparatuses 100a, 100b, and 100c are installed in multi-stages depending on the height of the charging container 150. The level sensing apparatuses are installed on the outer surface of the charging container 150 as shown in FIG. 2, but are not limited thereto and as described in FIG. 4, the level sensing apparatuses may be installed on the inner surface of the charging container 150.

The level sensing apparatuses are installed from the bottom of the charging container 150 in sequence and when the water surface ascends from A to B while the water is charged in the charging container 150, the level sensing apparatus 100a may sense that the water surface reaches the corresponding height.

Further, when the water surface is charged from B to C and from C to D while the water is continuously charged, the level sensing apparatuses 100b and 100c can sense charging up to the corresponding height by using the variation in the count values detected from the reference electrode and the level sensing electrode by being influenced by the water.

The invention claimed is:

1. A level sensing apparatus sensing a level of a detected material, the apparatus comprising:
   a circuit board;
   a reference electrode and a level sensing electrode having different dimensions, which are formed on one surface and the other surface of the circuit board, respectively;
   a first dielectric layer and a second dielectric layer having different thicknesses, which are formed on the reference electrode and the level sensing electrode; and
   a judgment unit electrically connected with the reference electrode and the level sensing electrode through the circuit board to judge the level of the detected material by using capacitances detected from the reference electrode and the level sensing electrode, respectively,
   wherein the thicknesses of the first dielectric layer and the second dielectric layer are formed so that the capacitance formed in the reference electrode is larger than the capacitance formed in the level sensing electrode when the level sensing apparatus is exposed to air, and the dimension of the reference electrode is larger than the dimension of the level sensing electrode so that the capacitance formed in the reference electrode is larger than the capacitance formed in the level sensing electrode when the level sensing apparatus is exposed to air,
   wherein the dimensions of the reference electrode and the level sensing electrode and the thicknesses of the first dielectric layer and the second dielectric layer are formed so that the capacitance formed in the level sensing electrode is larger than the capacitance formed in the reference electrode when the detected material approaches the level sensing apparatus, and
   wherein the first dielectric layer encapsulates the reference electrode and the second dielectric layer encapsulates the level sensing electrode.

2. The apparatus of claim 1, further comprising an internal oscillating circuit connected with at least one of the reference electrode and the level sensing electrode,
   wherein a frequency of an oscillation signal generated from the internal oscillating circuit is varied by each capacitance formed in the reference electrode or the level sensing electrode.

3. The apparatus of claim 1, wherein the level sensing apparatus is on the inner surface of a filling container filled with the detected material vertically to the inner surface or attached on the outer surface of the filling container in parallel to the outer surface.

4. A level sensing system detecting a level of a detected material, the system comprising:
   one or more level sensing apparatus on the inner surface or the outer surface of a filling container filled with the detected material in multi stages,
   wherein the one or more level sensing apparatus includes a circuit board; a reference electrode and a level sensing electrode having different dimensions, which are formed on one surface and the other surface of the circuit board, respectively; a first dielectric layer and a second dielectric layer having different thicknesses, which are formed on the reference electrode and the level sensing electrode, respectively; and a judgment unit electrically connected with the reference electrode and the level sensing electrode through the circuit board to judge the level of the detected material by using capacitances detected from the reference electrode and the level sensing electrode,
   wherein the thicknesses of the first dielectric layer and the second dielectric layer are formed so that the capacitance formed in the reference electrode is larger than the capacitance formed in the level sensing electrode when the level sensing apparatus is exposed to air and the dimension of the reference electrode is larger than the dimension of the level sensing electrode so that the capacitance formed in the reference electrode is larger than the capacitance formed in the level sensing electrode when the level sensing apparatus is exposed to air,
   wherein the dimensions of the reference electrode and the level sensing electrode and the thicknesses of the first dielectric layer and the second dielectric layer are formed so that the capacitance formed in the level sensing electrode is larger than the capacitance formed in the reference electrode when the detected material approaches the level sensing apparatus, and
   wherein the first dielectric layer encapsulates the reference electrode and the second dielectric layer encapsulates the level sensing electrode.

* * * * *